(No Model.)
H. W. STONE.
SELF VENTING BUNG.
No. 511,101.    Patented Dec. 19, 1893.
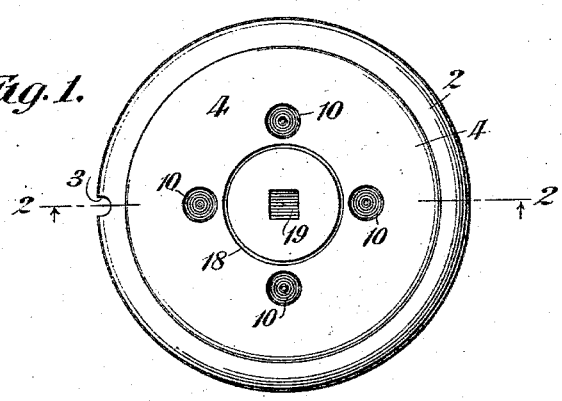
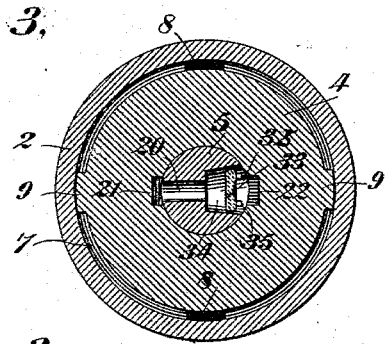
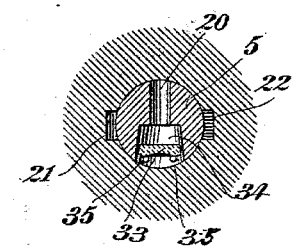
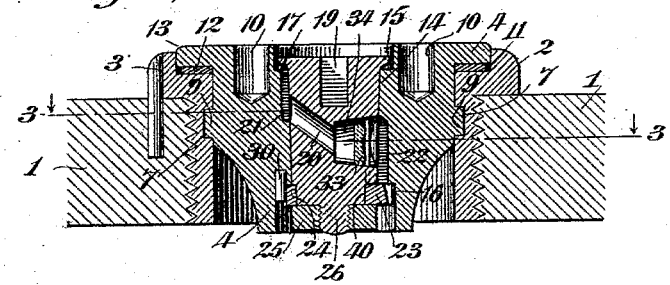
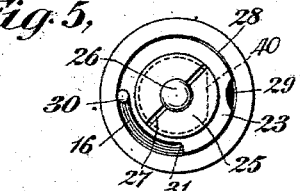
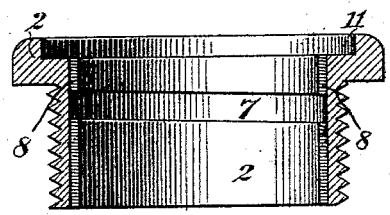
Witnesses
C. E. Ashley
H. W. Lloyd.
Inventor
H. W. Stone,
By his Attorneys
Fowler & Fowler

UNITED STATES PATENT OFFICE.

HARRY W. STONE, OF BROOKLYN, ASSIGNOR, BY DIRECT AND MESNE ASSIGNMENTS, TO THE BREWERS' METALLIC BUNG COMPANY, OF NEW YORK, N. Y.

SELF-VENTING BUNG.

SPECIFICATION forming part of Letters Patent No. 511,101, dated December 19, 1893.

Application filed May 9, 1892. Renewed June 29, 1893. Serial No. 479,173. (No model.)

*To all whom it may concern:*

Be it known that I, HARRY W. STONE, a citizen of the United States, residing at the city of Brooklyn, county of Kings, and State of New York, have invented certain new and useful Improvements in Self-Venting Bungs, of which the following is such a full, clear, and exact description as will enable any one skilled in the art to which it appertains to make and use the same, reference being had to the accompanying drawings, forming part of this specification.

My invention relates to a so-called self-venting bung for use with casks or vessels containing liquid, by means of which, through a slight operation of the bung by hand, the interior of the vessel may be placed in communication with the exterior air in order to permit a sufficient inflow of the air to allow the liquid contents to flow freely when drawn off by a spigot or faucet, and at the same time to prevent leakage of the gas from the vessel through the venting bung.

The principal objects of my invention are to provide a bung of this class that consists in a few durable parts; that may be readily put together and taken apart and parts of which may be renewed without necessitating the renewal of other parts; that may be readily operated by unskilled and careless persons; that will not be liable to get its operative parts clogged up with foreign matter or dirt; and that will withstand the rough usage to which it is generally subjected.

To these ends, my invention consists in the various novel and peculiar arrangements and combinations of the several parts of the device, all as fully hereinafter described and then pointed out in the claims.

In the accompanying drawings of my invention, Figure 1, is a top plan view of my improved bung in conjunction with a surrounding bushing by means of which the bung may be secured in the bung stave or wall of the vessel with which it may be used. Fig. 2, is a view in section, the plane of which is indicated by line 2—2, Fig. 1. In this view the device is shown as mounted in the bung stave or wall of the vessel which is also shown in section, and the bung is shown opened to admit the exterior air. Fig. 3, is a sectional view the plane of which section is a broken one as indicated by line 3—3, Fig. 2, the bung being here shown as open. Fig. 4, is a similar sectional view to that of Fig. 3, but with the bushing and part of the casing of the bung omitted. In this view the bung is shown as closed. Figs. 5 and 6, are partial plan views of the inner end of the device with the parts represented in open and closed positions, respectively. Fig. 7, is a sectional view of the bushing detached, the plane of the section being taken on a line indicated by line 2—2, Fig. 1. Fig. 8, is a side view of the rotary valve or plug detached.

Referring to the drawings, in which like numbers of reference indicate like parts, 1 designates the bung-stave or wall of the vessel or barrel into an opening in which is screwed the annular metallic bushing 2, which is for this purpose provided with an external screw-thread, and this bushing is also formed with an external shoulder extending around the outer edge thereof so as to overlie the wall into which it is set. A hole or notch 3 is formed vertically in the edge of the outer rim of the bushing for the reception of a fastening screw or nail which may be entered in the same and driven into the stave, in order to prevent the bushing from working loose.

The bung proper comprises a cylindrical casing 4, and the rotary valve or plug 5 and the bung is removably mounted in position in the bushing and is securely held therein against displacement by means of the locking grooves 7, 7, formed on the interior face of the bushing with a spiral trend and provided with the vertical recesses 8, 8, extending from the mouth or outer edge of the bushing down to and communicating with the said grooves and in which work the laterally-extending lugs 9, 9, located at diametrically-opposite points upon the exterior of the bung-casing 4. The diameter of the body of the casing 4 is such as to make a snug fit with the interior of the bushing, into which it is entered by placing the lugs 9, 9, so as to register with the recesses 8, 8, and forcing the casing in until the lugs encounter the locking grooves 7, 7, respectively, whereupon by giving the casing a partial turn on its axis, it is drawn tightly into place and securely held by virtue of the lugs being forced onto the high part of the spirally-inclined grooves. In order to give the casing a forcible turn in mounting it in position or dismounting it, I provide the same with a set of four equidistant holes 10, which are arranged in a circle concentric with the axis of the casing and upon the outer flat face thereof. By entering two fixed prongs of any suitable instrument in two diametrically-opposite holes 10, 10, and partially rotating it the bung-casing 4 may be secured in position, or may be detached by giving the instrument or key a turn in the reverse direction. A gas and liquid tight joint is provided between the casing 4 and the bushing, by forming the latter with an annular recess 11 about its mouth or outer end and placing a suitable gasket or washer 12 therein, so as to lie between the bushing and the outwardly projecting annular rim 13 formed upon the outer edge of the casing.

The bung-casing 4, is formed with a central perforation or orifice 14, which is circular in cross-section and extends through the casing from the inner to the outer face thereof. This perforation 14, which constitutes the valve seat of the rotary valve or plug 5, is formed at its outer end with a countersink 15 and at its inner end with a countersink 16, in the former of which, namely, 15, is disposed the flange or head 17 of the valve or plug 5, which head is of less diameter than that of the countersink 15, so as to leave an annular space there-between and the head is beveled on its under side to form a space between the beveled surface and the shoulder of the countersink. The annular opening or space 18, formed between the head of the plug 5 and the countersink 15 of the casing, constitutes the exterior mouth of the vent or air passage between the exterior air and the interior of the vessel. By virtue of the peculiar construction of this rotary plug 5, which is thus countersunk in the casing, any foreign matter or dirt which may become lodged in the mouth of the vent, will be easily loosened and dislodged upon turning the plug, as hereinafter described, to open the bung—the turning of the plug 5 being effected by means of an angular keyhole 19 formed centrally in the head of the plug and a suitable key, which, by insertion therein, will serve to turn the plug in one direction or the other according to the direction in which the key may be rotated.

The perforation or orifice 14 is preferably tapered from its outer to its inner end, which is the smaller, and the valve or plug 5 is accordingly tapered to make a snug fit therewith. In order to insure a good joint between the valve or plug 5 and its seat 14 I make the same a ground joint like the ordinary cock of the key of a gas fixture. This conically-shaped or tapered plug-cock is formed with a transverse air passage 20, which in the present construction extends obliquely through the plug from one side thereof to the other, cutting the vertical axis of the same, as will be understood from Figs. 3, 4 and 5. The outer mouth 18 of the vent, is in communication with the adjacent and upper end of the air passage 20, through means of a suitable air-duct or groove 21, which extends vertically from the outer end of the perforation or valve-seat 14 a suitable distance down the same. The end of the bung within the vessel is in communication with the adjacent and lower end of the air-passage 20, through means of a similar air-duct or groove 22, which is likewise formed in the interior face of the valve-seat and extends from the inner end thereof to a suitable distance within the same. This valve or plug 5 is mounted so that it may be turned in its seat at the same time it is held against endwise movement therein, by means of a collar 23 which surrounds the reduced inner end 24 of the plug within the countersink 16, and a jam-nut 25 working on the centrally-disposed screw-stem 26 at the base of the plug—the face of the nut being formed with a suitable slit 27 for receiving a forked blade by means of which the nut may be tightened or loosened and the parts secured together or released. The collar 23 is formed with a notch or recess 29, which is adapted to register with the lower end of the air-duct or groove 22, when the plug 5 is turned into the position in which the groove 21 is in communication with the groove 22, through means of the transverse air-passage 20, as indicated in Figs. 2, 3 and 5. At this time the groove or duct 22 is in communication with the interior of the vessel through the notch 29, thereby affording an air-passage from the exterior to the interior of the vessel. The range of the turning or rotary movement of the plug-cock 5, is limited in both directions by means of a pin 30 fixed in the countersink 16 and a cutaway portion or notch 31 formed in the edge of the collar 23 and extending over about a quarter of its circumference. The collar 23, is formed with an interior straight edge corresponding with the shoulder 40, on the reduced end 24, of the plug, and it is thus enabled to turn with the plug in its rotary movements. Instead of the air-ducts 21 and 22, being in the form of grooves in the interior of the valve-seat 14, they may be in the form of perforations which extend from a point within the valve-seat through the body of the metal to the outer and inner ends of the bung, respectively.

The air-passage 20 of the valve or plug 5, is provided with a suitable automatic valve which, in the present construction, consists in a plate or body 33 working loosely in a chamber 34 formed at the lower end of the air-passage 20. This chamber is shaped like a truncated cone with the larger end outermost where it is provided with suitable stops 35 for limiting the movement of the valve to prevent it from going beyond the outer face of the valve-plug 5, and thereby allowing the back-flow of gas to get under the valve and stop it from automatically-closing communication with the outer air when it is called upon to perform this function. This cone-valve 33 is made of the usual material and serves, when closed, to completely seal the air-passage through the plug 5 and prevent the back-flow when the plug is turned into open position and a sufficient quantity of air has been admitted to the vessel.

From the foregoing description, the operation of the device will be readily understood. When the bung is closed, the parts assume the positions shown in Figs. 4 and 6, under which condition the air-passage through the bung is completely shut off by virtue of the plug 5 being turned so that its air-passage 20, will not register with the air-ducts or grooves 21, 22—the solid wall of the plug being presented to these grooves instead. To open the bung, a quarter turn is given the plug by hand, a suitable key being entered in the key-hole 19 for that purpose. This movement brings the parts into the position shown in Figs. 2, 3 and 5, wherein the air-passage 20 of the plug registers with the air-ducts 21 and 22 and thereby connects the outer mouth 18 of the bung with the inner end thereof, under which condition the air is admitted to the vessel. When thus opened any back-flow or leakage through the bung is prevented automatically by the action of the valve 33 in the plug as the same will be in such case quickly moved into closed position.

Other suitable means may be adopted for operating the valve-plug 5 by hand and other well known forms of automatic valve may be used with this plug. However, I have found the construction shown to be a very efficient and durable one. As the valve-plug 5 and its seat 14 are formed with a ground joint, the plug with its interior valve 33 may be readily renewed by first removing the bung-casing 4 and then releasing the jam-nut 25, whereupon the plug may be pushed out from the casing and the new one inserted. The bung-casing 4 may also be renewed if desired without necessarily renewing the valve-plug or any of the other parts.

From actual use of my improved bung with beer barrels and kegs, I have found it to be very efficient and to give all the desired results, it being perfect in its automatic sealing action in preventing back-flow of the gas and it also proves to be self-cleaning in dislodging the accumulations of dirt from the outer mouth of the vent. Instead of the transverse air-passage 20 running obliquely through the plug 5, it may obviously extend horizontally through and across the same at any point of its length, but such horizontal disposition of the passage would necessitate the lengthening of either or both of the air grooves or ducts 21, 22, and this is not desirable. It is mainly for this reason that I give the oblique inclination to the air-passage 20.

What I claim, and desire to secure by Letters Patent, is—

1. In a self-venting bung comprising a casing, a hand-operated rotary valve seated in said casing and held against endwise movement, said valve formed with an air-passage and controlling the vent through the bung and an automatic valve located within the air-passage of said rotary valve for preventing the back-flow.

2. A self-venting bung comprising a casing having a perforation or orifice extending through it and constituting a valve-seat, a rotary valve or plug formed with an air-passage and seated within the said perforation or orifice of the casing and affording a passage or vent through the casing when rotated into one position and cutting off such passage or vent when rotated into the other position, an automatic valve located within the air-passage of the said rotary valve or plug.

3. A self-venting bung comprising a casing having a perforation or orifice extending through it and formed with a countersink at its outer end whereby an internal annular shoulder is provided therein, a rotary valve or plug provided with an automatic valve and seated within the said perforation or orifice of the casing and having its outer end formed with a beveled flange or lip resting in said countersink and of less diameter than the same to form an air-passage around the flange.

4. A self-venting bung comprising a casing formed with a perforation or orifice constituting a valve-seat, a rotary valve or plug having an automatic valve and seated within said perforation and countersunk therein.

5. A self-venting bung comprising a casing formed with a perforation or orifice through the same constituting a valve-seat, an air-duct or groove leading from a point within the perforation to the outer end thereof and an air-duct or groove leading from a point within said perforation to the inner end thereof, a rotary plug formed with a transverse passage having an automatic valve located therein and seated within the said perforation or orifice and adapted to connect the two said air-ducts or grooves when turned into one position and thereby afford an air-passage through the casing and to disconnect said air-duct or groove when rotated into another position, and thereby cut off the air-passage through the casing.

6. A self-venting bung comprising a casing formed with a perforation or orifice extending through the same and constituting a valve-seat, an air-duct or groove extending from a point within said perforation to the outer end thereof and an air-duct or groove extending from a point within said perforation to the inner end thereof, a rotary plug provided with a transverse passage for connecting and disconnecting said air-ducts or grooves and having an automatic valve therein, the said plug seated within the said perforation or orifice of the casing and held against endwise movement therein and adapted to open the air-passage through said casing according to the position into which the plug may be turned.

7. A self-venting bung comprising the combination of a casing formed with a perforation or orifice 14 provided with an outer air-duct or groove 21, and an inner air-duct or groove 22, and constituting a valve-seat, a hand-operated rotary plug 5 seated within said perforation 14 and having a transverse air-passage 20 provided with an automatic valve 33 and adapted to connect and disconnect the said air-ducts 21 and 22, respectively, the said plug held against endwise movement, substantially as and for the purpose set forth.

8. A self-venting bung comprising the combination of a casing formed with a perforation or orifice 14 provided with the inner and outer air-ducts 21, 22, and formed with the countersink 15 at its outer end, a hand-operated rotary plug 5 seated within said perforation 14 and held against endwise movement and provided with an air-passage 20, having an automatic valve 33 located therein, the said plug formed with a flanged-head 17 of less diameter than that of the countersink 15, in which it is disposed, substantially as and for the purpose set forth.

In testimony whereof I have hereunto set my hand, this 7th day of May, 1892, in the presence of the two subscribing witnesses.

HARRY W. STONE.

Witnesses:
F. W. RANDALL,
WILLIS FOWLER.